United States Patent
Magonigal et al.

(10) Patent No.: US 11,117,681 B2
(45) Date of Patent: Sep. 14, 2021

(54) HOVER FLIGHT TEST SYSTEM FOR AIRCRAFT

(71) Applicant: The Boeing Company, Chicago, IL (US)

(72) Inventors: Sean C. Magonigal, Queen Creek, AZ (US); James B. Dryfoos, Glen Mills, PA (US); Jeffrey S. Bender, Gilbert, AZ (US); John C. Walters, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 167 days.

(21) Appl. No.: 16/514,702

(22) Filed: Jul. 17, 2019

(65) Prior Publication Data

US 2021/0016902 A1    Jan. 21, 2021

(51) Int. Cl.
*B64F 5/00* (2017.01)
*B64F 5/60* (2017.01)
*G01M 17/00* (2006.01)

(52) U.S. Cl.
CPC .............. *B64F 5/60* (2017.01); *G01M 17/00* (2013.01)

(58) Field of Classification Search
CPC .............. B64F 5/00; B64F 5/60; G01M 17/00
See application file for complete search history.

(56) References Cited

U.S. PATENT DOCUMENTS

| | | | |
|---|---|---|---|
| 5,176,341 A * | 1/1993 | Ishikawa | B64F 1/14 24/136 R |
| 10,676,331 B1 * | 6/2020 | Dorsey | B64C 39/024 |
| 2005/0156082 A1 * | 7/2005 | Eberle | B64B 1/58 244/96 |
| 2007/0246602 A1 * | 10/2007 | Steinkerchner | B64B 1/66 244/30 |
| 2008/0156932 A1 * | 7/2008 | McGeer | B64F 1/02 244/110 C |
| 2008/0265086 A1 * | 10/2008 | Lee | B64B 1/56 244/30 |
| 2011/0233329 A1 * | 9/2011 | McGeer | B64F 1/029 244/110 F |
| 2011/0267241 A1 * | 11/2011 | Grimm | H02S 10/12 343/706 |
| 2015/0331420 A1 * | 11/2015 | Chubb | F03D 13/30 701/7 |
| 2016/0083115 A1 * | 3/2016 | Hess | B64C 39/022 701/3 |
| 2016/0200437 A1 * | 7/2016 | Ryan | B64C 39/022 244/99.2 |
| 2017/0225784 A1 * | 8/2017 | Hayes | B64C 39/024 |
| 2018/0162528 A1 * | 6/2018 | McGrew | B64C 27/08 |
| 2018/0346297 A1 * | 12/2018 | Schmidt | B66D 1/28 |
| 2019/0152577 A1 * | 5/2019 | Kim | B64B 1/58 |
| 2020/0039663 A1 * | 2/2020 | Avena De Azevedo | B64F 1/14 |
| 2020/0062421 A1 * | 2/2020 | Paz Duart | B64F 3/00 |

(Continued)

*Primary Examiner* — Eric S. McCall
(74) *Attorney, Agent, or Firm* — Duft & Bornsen, PC

(57) ABSTRACT

Test systems and methods for testing hover flight of an Unmanned Aerial Vehicle (UAV). In one embodiment, a test system includes a winch having a cable, and a mounting tree assembly configured to attach to the cable of the winch and to attach to the UAV. The winch is configured to restrain an altitude of the UAV during hover flight while the mounting tree assembly permits five degrees of freedom for the UAV.

20 Claims, 8 Drawing Sheets

(56) References Cited

U.S. PATENT DOCUMENTS

| | | | |
|---|---|---|---|
| 2020/0239159 A1* | 7/2020 | Kunz | B64F 1/02 |
| 2020/0361589 A1* | 11/2020 | Kuhlmann | G05D 1/101 |
| 2020/0361631 A1* | 11/2020 | Leone | B64C 39/024 |
| 2020/0369375 A1* | 11/2020 | Leone | B64C 19/00 |
| 2020/0377190 A1* | 12/2020 | Mahmoudi | B64B 1/50 |
| 2021/0011492 A1* | 1/2021 | Raabe | B64C 39/024 |

* cited by examiner

HOVER FLIGHT TEST SYSTEM FOR AIRCRAFT

FIELD

This disclosure relates to the field of test systems, and more particularly, to test systems for aircraft.

BACKGROUND

A type of aircraft that can take off, hover, and land vertically is referred to as a Vertical Take-off and Landing (VTOL) aircraft. Unmanned Aerial Vehicles (UAV), drones, and the like are examples of aircraft that are capable of vertical take-off, hover, and landing. When the design of a UAV is new or is being modified, it may be beneficial to test the UAV in a controlled environment for vertical flight, such as inside of a building. A UAV may have unpredictable movements when first ascending to a hover position, and this can create hazards for the UAV and the test team if the UAV is unrestrained. Some test systems have been suggested that use slack tethers, spring tethers, or short taut tethers to mitigate uncontrolled movements and measure hover performance. However, these techniques can impart excessive loads at the attach point on the UAV, and create disturbances to the flight dynamics which may be beyond the capability of the flight control system, particularly when in early development.

SUMMARY

Provided herein is a test system and associated method for testing a UAV in hover flight. The test system as described herein restrains the UAV at a hover position with a winch that maintains tension on a cable while the UAV ascends and hovers. This allows for a controlled ascent to a hover position without large shock loads and mechanical disturbance to the flight control system of the UAV. The winch also allows the UAV to ascend to a hover position at a high-power setting while providing tight control over the ascent rate and maximum altitude. The test system acts as both an altitude control and position hold while conducting flight testing, such as in an indoor environment where Global Positioning Systems (GPS) are not available. The test system uses a mounting tree assembly to attach the UAV to the winch. The mounting tree assembly has a structure that permits five degrees of freedom for the UAV in hover flight. Thus, the UAV may have longitudinal, lateral, pitch, roll, and yaw movement when restrained so that a test team may evaluate the performance of the UAV.

One embodiment comprises a test system for a UAV. The test system comprises a winch having a cable, and a mounting tree assembly configured to attach to the cable of the winch and to attach to the UAV. The winch is configured to restrain an altitude of the UAV during hover flight while the mounting tree assembly permits five degrees of freedom for the UAV.

In another embodiment, the winch is configured to maintain tension on the cable to provide for a controlled ascent of the UAV to a hover position.

In another embodiment, the test system further comprises a controller configured to adjust a resistance of the winch to control an ascent rate of the UAV.

In another embodiment, the mounting tree assembly is configured to rotate about a vertical axis due to twisting of the cable. The mounting tree assembly comprises a frame member pivotally coupled to the cable to pivot about a first horizontal axis. The mounting tree assembly further comprises a first connecting arm having a first end pivotally coupled to the frame member to pivot about a second horizontal axis that is parallel to the first horizontal axis. The mounting tree assembly further comprises a second connecting arm longitudinally spaced from the first connecting arm and having a first end pivotally coupled to the frame member to pivot about a third horizontal axis that is parallel to the first horizontal axis and the second horizontal axis. The mounting tree assembly further comprises vehicle connectors at a second end of the first connecting arm and at a second end of the second connecting arm. The vehicle connectors are configured to pivotally couple to the UAV to pivot about a fourth horizontal axis that is perpendicular to the first horizontal axis, the second horizontal axis, and the third horizontal axis. One or more of the vehicle connectors is configured to pivotally couple to the first connecting arm to pivot about a fifth horizontal axis that is parallel to the second horizontal axis, and one or more of the vehicle connectors is configured to pivotally couple to the second connecting arm to pivot about a sixth horizontal axis that is parallel to the third horizontal axis.

In another embodiment, the first connecting arm is comprised of first vertical members and a first horizontal member that form a T-shape. One end of the first vertical members is pivotally coupled to the frame member to pivot about the second horizontal axis, and another end of the first vertical members are pivotally coupled to the first horizontal member so that the first horizontal member pivots about the fifth horizontal axis. A first pair of the vehicle connectors are spaced apart along a length of the first horizontal member.

In another embodiment, the second connecting arm is comprised of second vertical members and a second horizontal member that form a T-shape. One end of the second vertical members is pivotally coupled to the frame member to pivot about the third horizontal axis, and another end of the second vertical members are pivotally coupled to the second horizontal member so that the second horizontal member pivots about the sixth horizontal axis. A second pair of the vehicle connectors are spaced apart along a length of the horizontal member.

In another embodiment, the cable pivotally couples with the frame member at a pivoting joint member that is disposed toward a longitudinal center of the frame member.

In another embodiment, the test system further comprises a pulley disposed between the winch and the mounting tree assembly, and configured to change of direction of the cable from horizontal to vertical.

In another embodiment, the test system further comprises a plurality of guide wires disposed between the mounting tree assembly and the UAV, and configured to restrict swinging of the mounting tree assembly in relation to the UAV.

Another embodiment comprises a method of performing a hover test of a UAV. The method comprises pivotally coupling a mounting tree assembly to a cable of a winch, pivotally coupling the UAV on the mounting tree assembly, controlling the winch to reel out the cable allowing the UAV to ascend while maintaining tension on the cable, and restraining the UAV at a hover position with the winch. The UAV has five degrees of freedom while hovering due to a structure of the mounting tree assembly.

In another embodiment, the method further comprises stringing the cable through a pulley on a base surface to change a direction of the cable from horizontal to vertical.

In another embodiment, controlling the winch comprises adjusting a resistance of the winch to control an ascent rate of the UAV.

In another embodiment, the method further comprises controlling a descent of the UAV while maintaining tension on the cable.

In another embodiment, controlling the descent of the UAV comprises overpowering propulsors on the UAV to bring the UAV back to the ground.

Another embodiment comprises a test system comprising a winch having a cable, and a mounting tree assembly configured to attach to the cable of the winch and to attach to a UAV. The mounting tree assembly comprises a frame member pivotally coupled to the cable to pivot about a first horizontal axis, and a pair of connecting arms longitudinally spaced along the frame member. Each of the connecting arms is a T-shaped member comprising vertical members pivotally coupled to the frame member to pivot about a second horizontal axis that is parallel to the first horizontal axis, a horizontal member pivotally coupled to the vertical members to pivot about a third horizontal axis that is parallel to the first horizontal axis and the second horizontal axis, and vehicle connectors configured to pivotally couple to the UAV to pivot about a fourth horizontal axis that is perpendicular to the first horizontal axis, the second horizontal axis, and the third horizontal axis.

In another embodiment, the mounting tree assembly is configured to rotate about a vertical axis due to twisting of the cable.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
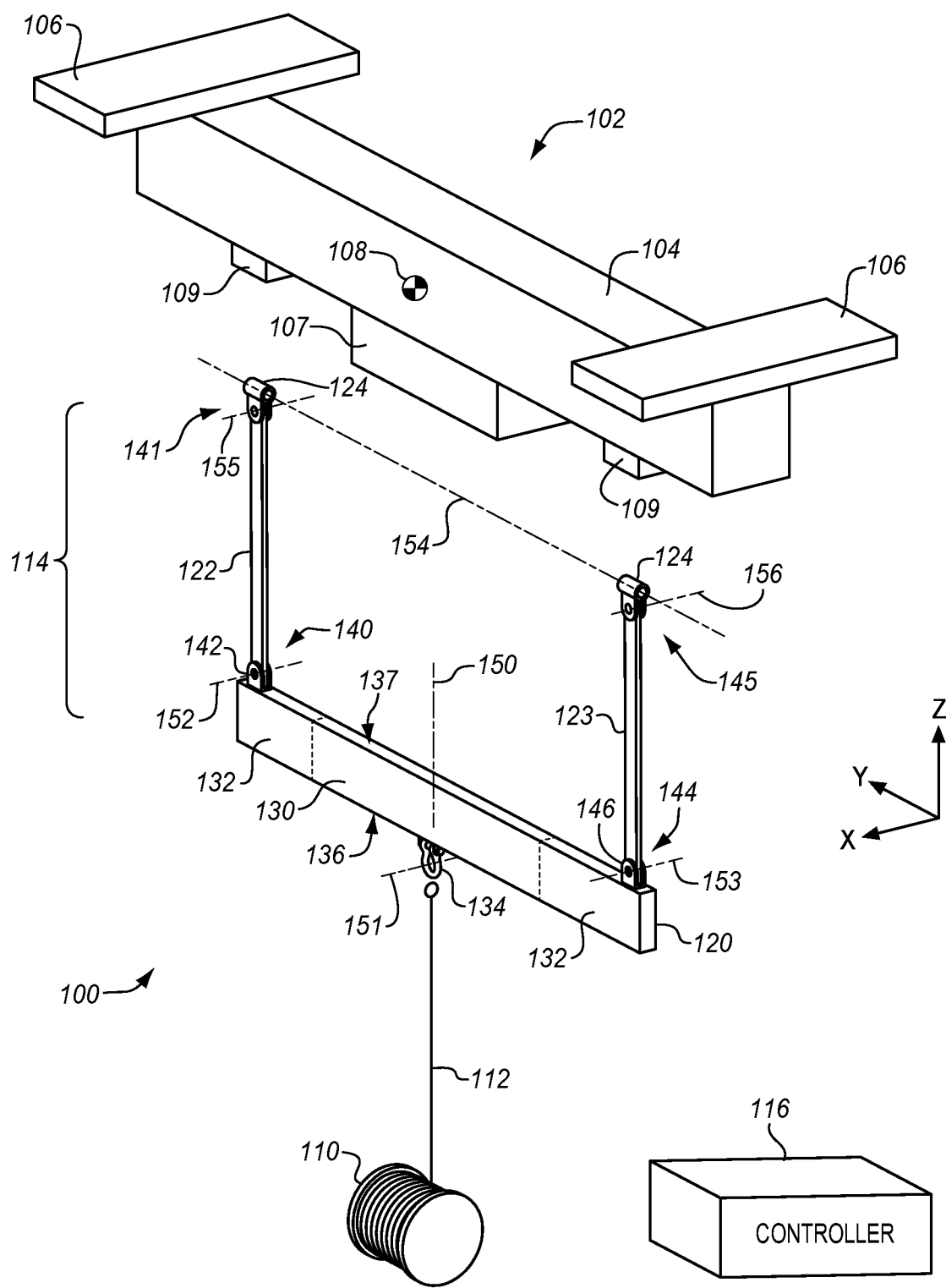
FIG. 1 is a perspective view of a test system in an illustrative embodiment.

FIG. 1 is a perspective view of a test system 100 in an illustrative embodiment. Test system 100 is configured to restrain a UAV 102 during hover flight. In this figure, UAV 102 is shown in block diagram form because the design/structure of UAV 102 may vary as desired. UAV 102 is an aircraft capable of vertical flight, and includes an airframe 104 and one or more propulsors 106. Airframe 104 represents the physical structure of UAV 102, and propulsors 106 comprise elements that generate lift for UAV 102. For example, propulsors 106 may comprise one or more rotors mounted on electric motors that rotate to generate lift. With this design, UAV 102 is able to take off and land vertically, hover, fly forwards, backwards, and laterally. UAV 102 is shown as having a battery box 107 toward the center of airframe 104, which is a structural member(s) that stores one or more batteries that provide power for UAV 102. The battery(ies) add weight to UAV 102, so battery box 107 is usually positioned toward the center of airframe 104 so that UAV 102 is properly balanced. In a restrained test, it may be beneficial to connect an anchor at or near the center of mass (COM) 108 of UAV 102, but the location of battery box 107 interferes with an attachment at the COM 108. Thus, UAV 102 includes mounting locations 109 that are offset from COM 108.

Test system 100 includes a winch 110 with a cable 112, and a mounting tree assembly 114. Mounting tree assembly 114 is a structural element that is configured to attach to UAV 102 under test. Winch 110 is a mechanical device that is used to wind up or wind out to adjust the tension of cable 112. Cable 112 may comprise a rope, a wire, a cord, a tether, etc. Test system 100 may further include a controller 116 configured to control winch 110, UAV 102, and/or other automated components of test system 100. Test system 100 may further include other components that are not shown for the sake of brevity.

In a test scenario, mounting tree assembly 114 is attached to UAV 102, and cable 112 is anchored by winch 110 and/or one or more intermediate pulleys. Propulsors 106 of UAV 102 power up so that UAV 102 ascends vertically. As UAV 102 ascends, winch 110 maintains tension on cable 112 to provide for a controlled ascent, and anchors UAV 102 at a desired hover position above the ground to restrain the altitude of UAV 102. At the same time, the structure of mounting tree assembly 114 permits five degrees of freedom for the UAV 102 when cable 112 is taut and UAV 102 is anchored. In this embodiment, mounting tree assembly 114 includes a frame member 120, a plurality of connecting arms 122-123, and vehicle connectors 124. As will be described in more detail below, frame member 120 (or mounting tree assembly 114 as a whole) is configured to pivot or rotate about an axis 150 (relating to the z-axis), such as due to twisting of cable 112 between the anchor point and frame member 120. Axis 150 is generally a vertical axis in relation to the ground, and may relate to the yaw axis of an aircraft. It may be desirable if cable 112 does not impose a twisting or yawing force on UAV 102, but also does not restrain rotation on axis 150 to simulate free unrestrained flight dynamics. Frame member 120 is also configured to pivot or rotate about axis 151 (relating to the x-axis) in relation to cable 112. Axis 151 is perpendicular to axis 150, and is generally a horizontal axis in relation to the ground. Axis 151 may relate to the pitch axis of an aircraft.

Connecting arms 122-123 are configured to pivot or rotate about parallel axes 152-153 (also relating to the x-axis) in relation to frame member 120, which are parallel to axis 151 and perpendicular to axis 150. Axes 152-153 are generally horizontal axes in relation to the ground, and may also relate to the pitch axis of an aircraft. Vehicle connectors 124 are configured to pivot or rotate about an axis 154 (relating to the y-axis) in relation to UAV 102, which is perpendicular to axes 150-153. Axis 154 is generally a horizontal axis in relation to the ground, and may relate to the roll axis of an aircraft. Vehicle connectors 124 are also configured to pivot or rotate about horizontal axes 155-156 in relation to connecting arms 122-123, which are parallel to axes 152-153. Due to this structure, mounting tree assembly 114 allows movement of UAV 102 along multiple axes even when anchored in the hover position. Mounting tree assembly 114 also simulates attachment to UAV 102 at or near COM 108, which best simulates how forces from propulsors 106 will be reacted on UAV 102 in free/unrestrained flight.

Frame member 120 is a structural beam that is oriented generally horizontal during a test. Frame member 120 is an elongated member having a center section 130 and end sections 132 along its length. Although frame member 120 is shown as a rectangular beam in FIG. 1, it may have other elongated shapes. A pivoting joint member 134 is attached, affixed, or otherwise disposed at frame member 120, and is configured to couple with cable 112. Pivoting joint member 134 forms a revolute or hinged joint that allows frame member 120 to pivot about axis 151 in relation to cable 112. Pivoting joint member 134 may be disposed at center section 130, such as at the center of frame member 120 in the lengthwise direction. Pivoting joint member 134 is shown as being on a bottom surface 136 of frame member 120, but may be at other locations in other embodiments.

Connecting arms 122-123 are structural members that are disposed between frame member 120 and UAV 102, and are oriented generally vertical during a test. Connecting arms 122-123 are mechanically coupled to frame member 120, and are longitudinally spaced apart along the length of frame member 120. For instance, connecting arms 122-123 are coupled to frame member 120 at opposing end sections 132. Looking at the leftmost connecting arm 122 in FIG. 1, one end 140 of connecting arm 122 is pivotally coupled to frame member 120 via a pivoting joint member 142. Pivoting joint member 142 forms a revolute or hinged joint that allows connecting arm 122 to pivot about axis 152 in relation to frame member 120. Pivoting joint member 142 is shown as being on a top surface 137 of frame member 120, but may be at other locations in other embodiments. The other end 141 of connecting arm 122 includes one or more vehicle connectors 124, which are configured to couple with UAV 102. Vehicle connector 124 may form a universal joint that allows UAV 102 to pivot about multiple axes 154-155 in relation to connecting arm 122 and UAV 102. Looking at the rightmost connecting arm 123 in FIG. 1, one end 144 of connecting arm 123 is pivotally coupled to frame member 120 via a pivoting joint member 146. Pivoting joint member 146 forms a revolute or hinged joint that allows connecting arm 123 to pivot about axis 153 in relation to frame member 120, which is parallel to axes 151-152. Pivoting joint member 146 is shown as being on a top surface 137 of frame member 120, but may be at other locations in other embodiments. The other end 145 of connecting arm 123 includes one or more vehicle connectors 124. Vehicle connector 124 may form a universal joint that allows UAV 102 to pivot about multiple axes 154/156 in relation to connecting arm 123 and UAV 102. Although two connecting arms 122-123 are shown in FIG. 1, mounting tree assembly 114 may include more connecting arms as desired.

Figure 2:
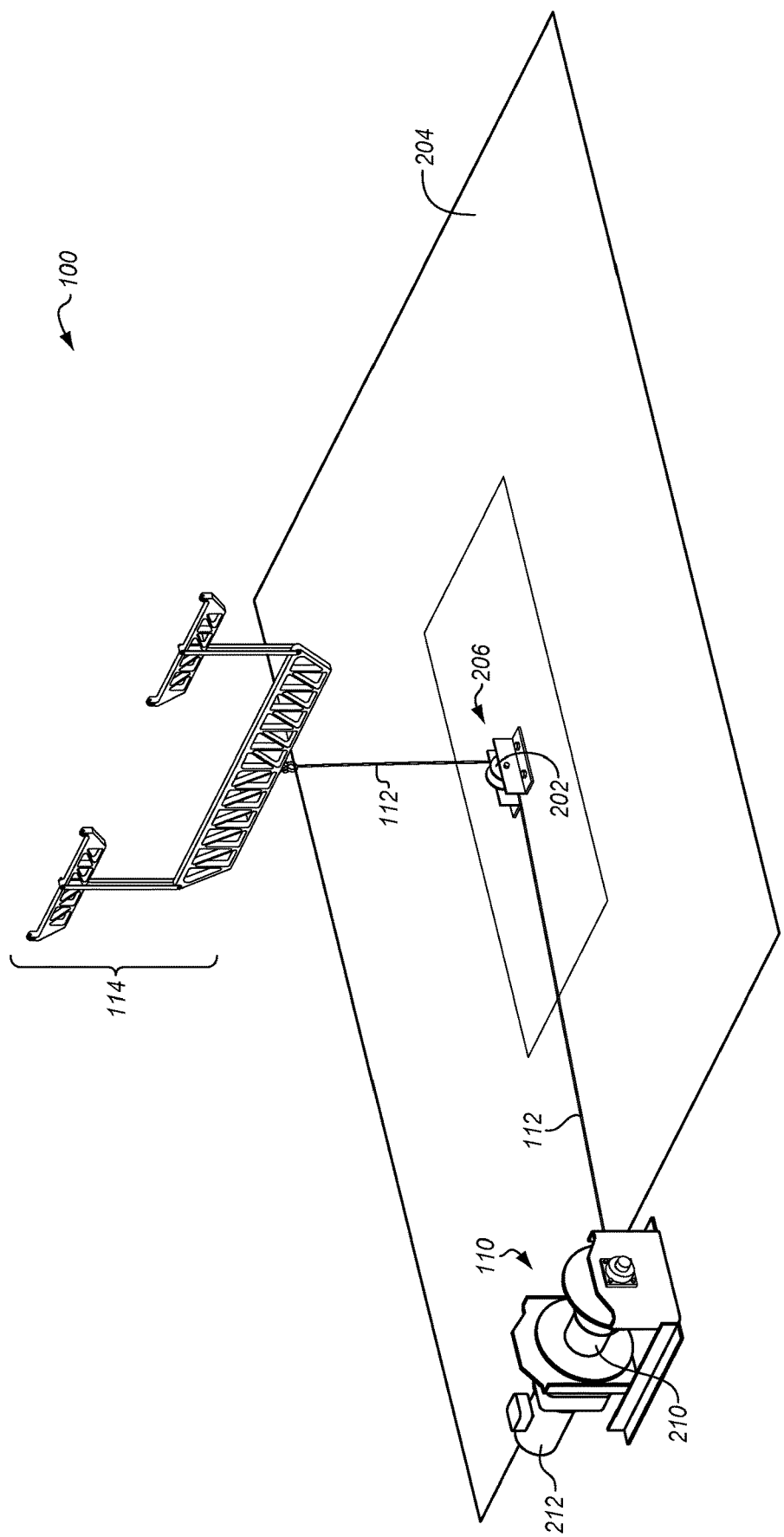
FIG. 2 is a perspective view of a test system in another illustrative embodiment.

FIG. 2 is a perspective view of test system 100 in another illustrative embodiment. It is noted again that reference numbers used herein may indicate the same type of element in the drawings. Thus, similar reference numbers are used in FIGS. 1-2 even though there may be structural differences between the systems and elements. In this embodiment, test system 100 includes winch 110 and mounting tree assembly 114. Winch 110 includes a drum 210, which is a circular-shaped member upon which cable 112 is wrapped. Drum 210 is configured to turn in a circular motion to wind cable 112 in or out. Winch 110 further includes a motor 212 that powers drum 210 to wind cable 112 in or out. Motor 212 may be controlled manually or in an automated manner, such as with controller 116 (see FIG. 1).

Test system 100 further includes a pulley 202 that is attached to a base surface 204, which may comprise the ground, the floor of a building, a platform for test system 100, etc. Pulley 202 is disposed between winch 110 and mounting tree assembly 114 to change the direction of cable 112. Cable 112 is disposed generally horizontal between winch 110 and pulley 202, and pulley 202 changes the direction of cable 112 to be disposed generally vertical. Pulley 202 therefore defines an anchor point 206 for cable 112 and mounting tree assembly 114.

Figure 3:
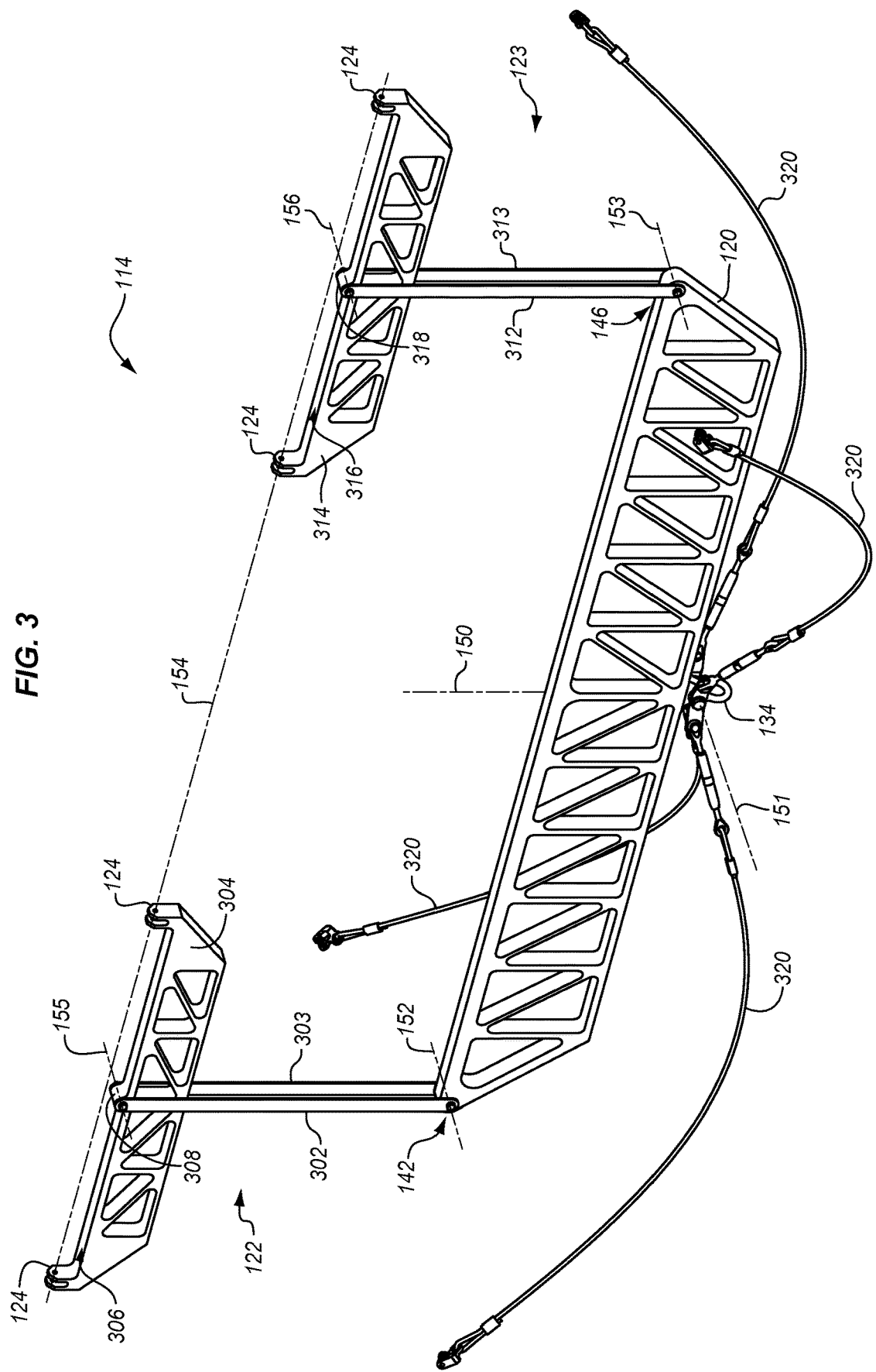
FIG. 3 is a perspective view of a mounting tree assembly in an illustrative embodiment.

FIG. 3 is a perspective view of mounting tree assembly 114 in an illustrative embodiment. As with FIG. 1, mounting tree assembly 114 includes frame member 120 and connecting arms 122-123. Connecting arm 122 is pivotally coupled to frame member 120 via pivoting joint member 142, and is configured to pivot about axis 152 in relation to frame member 120. Connecting arm 123 is pivotally coupled to frame member 120 via pivoting joint member 146, and is configured to pivot about axis 153 in relation to frame member 120. In this embodiment, connecting arms 122-123 each include a pair of vertical members and a horizontal member. For example, connecting arm 122 includes vertical members 302-303 and a horizontal member 304 that form a T-shaped arm. Vertical members 302-303 are elongated members that are oriented generally vertical in relation to the ground, and horizontal member 304 is an elongated member that is oriented generally horizontal. One end of vertical members 302-303 are pivotally coupled to frame member 120 via pivoting joint member 142, and the other end of vertical members 302-303 are pivotally coupled to horizontal member 304 via a pivoting joint member 308. Pivoting joint member 308 forms a revolute or hinged joint that allows horizontal member 304 to pivot about axis 155 in relation to vertical members 302-303, which is parallel to axis 152. Pivoting joint member 308 is shown as being on a top surface 306 of horizontal member 304, but may be at other locations in other embodiments (e.g., at the bottom surface). A pair of vehicle connectors 124 are disposed at horizontal member 304, and are longitudinally spaced apart. In this embodiment, vehicle connectors 124 are disposed at top surface 306 of horizontal member 304, but the locations of vehicle connectors 124 may vary depending on the mounting locations 109 on a UAV 102. Vehicle connectors 124 allow a UAV 102 to pivot about axis 154 in relation to connecting arm 122.

Likewise, connecting arm 123 includes vertical members 312-313 and a horizontal member 314 that form a T-shaped arm. One end of vertical members 312-313 are pivotally coupled to frame member 120 via pivoting joint member 146, and the other end of vertical members 312-313 are pivotally coupled to horizontal member 314 via a pivoting joint member 318. Pivoting joint member 318 forms a revolute or hinged joint that allows horizontal member 314 to pivot about axis 156 in relation to vertical members 312-313, which is parallel to axis 153. Pivoting joint member 318 is shown as being on a top surface 316 of horizontal member 314, but may be at other locations in other embodiments (e.g., at the bottom surface). A pair of vehicle connectors 124 are disposed at horizontal member 314, and are longitudinally spaced apart. In this embodiment, vehicle connectors 124 are disposed at top surface 316 of horizontal member 314, but the locations of vehicle connectors 124 may vary depending on the mounting locations 109 on a UAV 102. Vehicle connectors 124 allow a UAV 102 to pivot about axis 154 in relation to connecting arm 122.

Mounting tree assembly 114 may further include a plurality of guide wires 320 disposed between frame member 120 and UAV 102. Guide wires 320 are configured to restrict swinging of mounting tree assembly 114 in relation to UAV 102.

Figure 4:
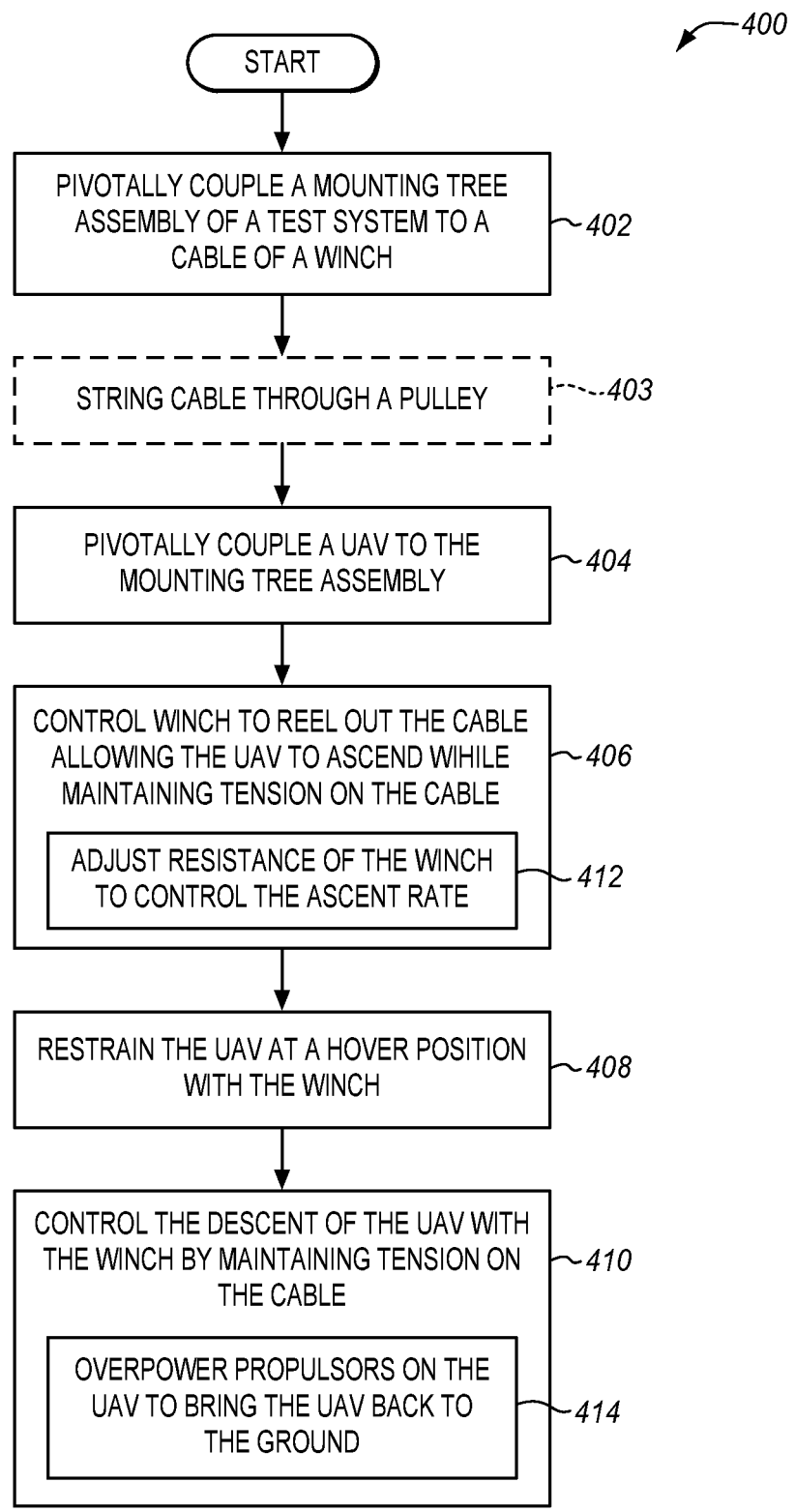
FIG. 4 is a flow chart illustrating a method of performing a hover test for a UAV in an illustrative embodiment.

FIG. 4 is a flow chart illustrating a method 400 of performing a hover test for UAV 102 in an illustrative embodiment. The steps of method 400 will be described with respect to test system 100 of FIG. 2, although one skilled in the art will understand that the methods described herein may be performed on other types of test systems. The steps of the methods described herein are not all inclusive and may include other steps not shown. The steps for the flow charts shown herein may also be performed in an alternative order.

For method 400, a mounting tree assembly 114 of test system 100 is pivotally attached to cable 112 of winch 110 (step 402). For example, a clevis faster or the like may be used to connect cable 112 to a mounting tree assembly 114 to form a pivoting joint member 134. Mounting tree assembly 114 may therefore pivot about an axis 151 (see FIG. 3) in relation to cable 112, which is generally a horizontal axis in this embodiment. Cable 112 may be strung through a pulley 202 on a base surface 204 to change a direction of cable 112 from horizontal to vertical, and define an anchor point 206 (optional step 403).

Figure 5:
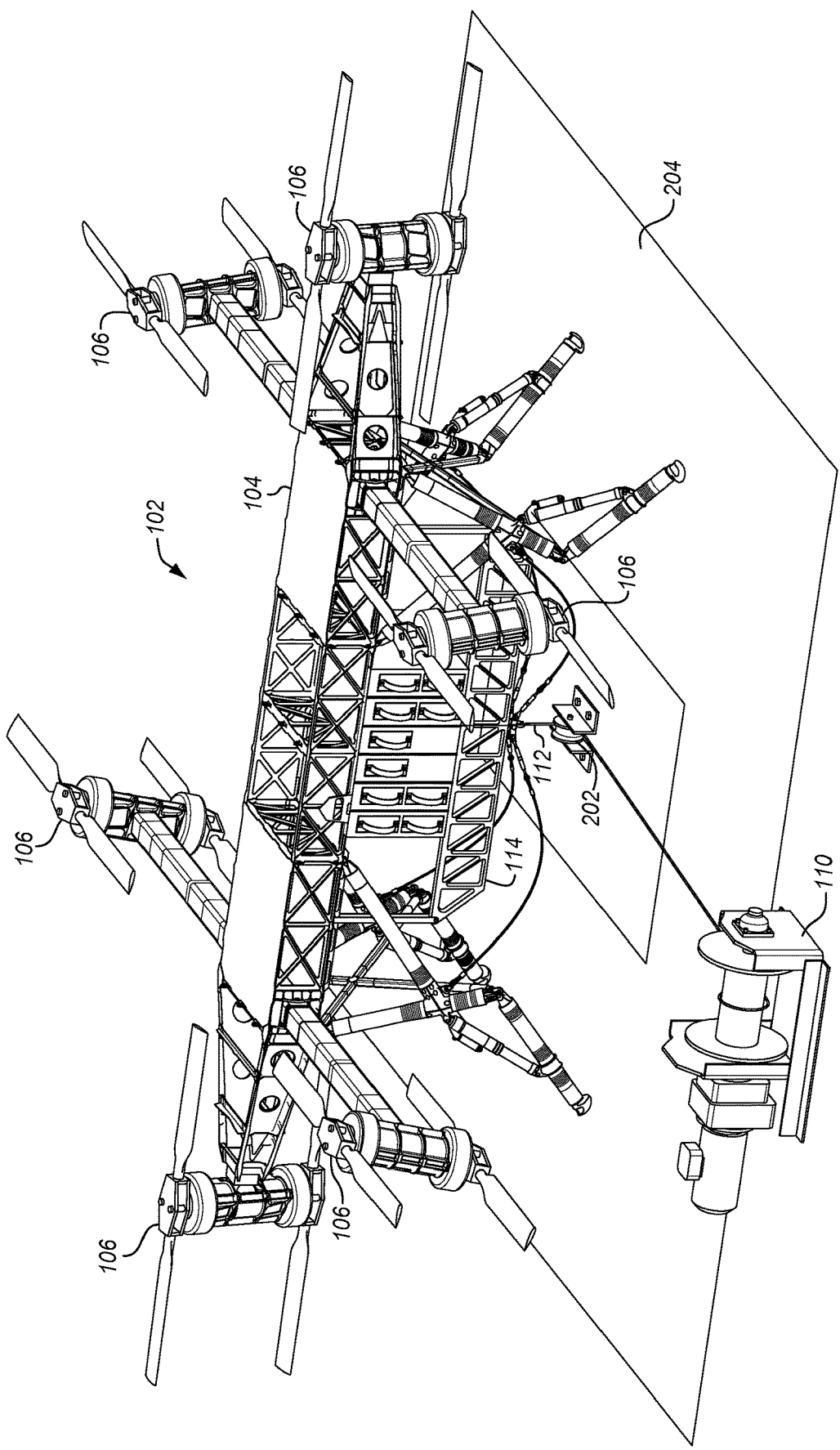
FIG. 5 is a perspective view of a UAV mounted on a mounting tree assembly in an illustrative embodiment.
Figure 6:
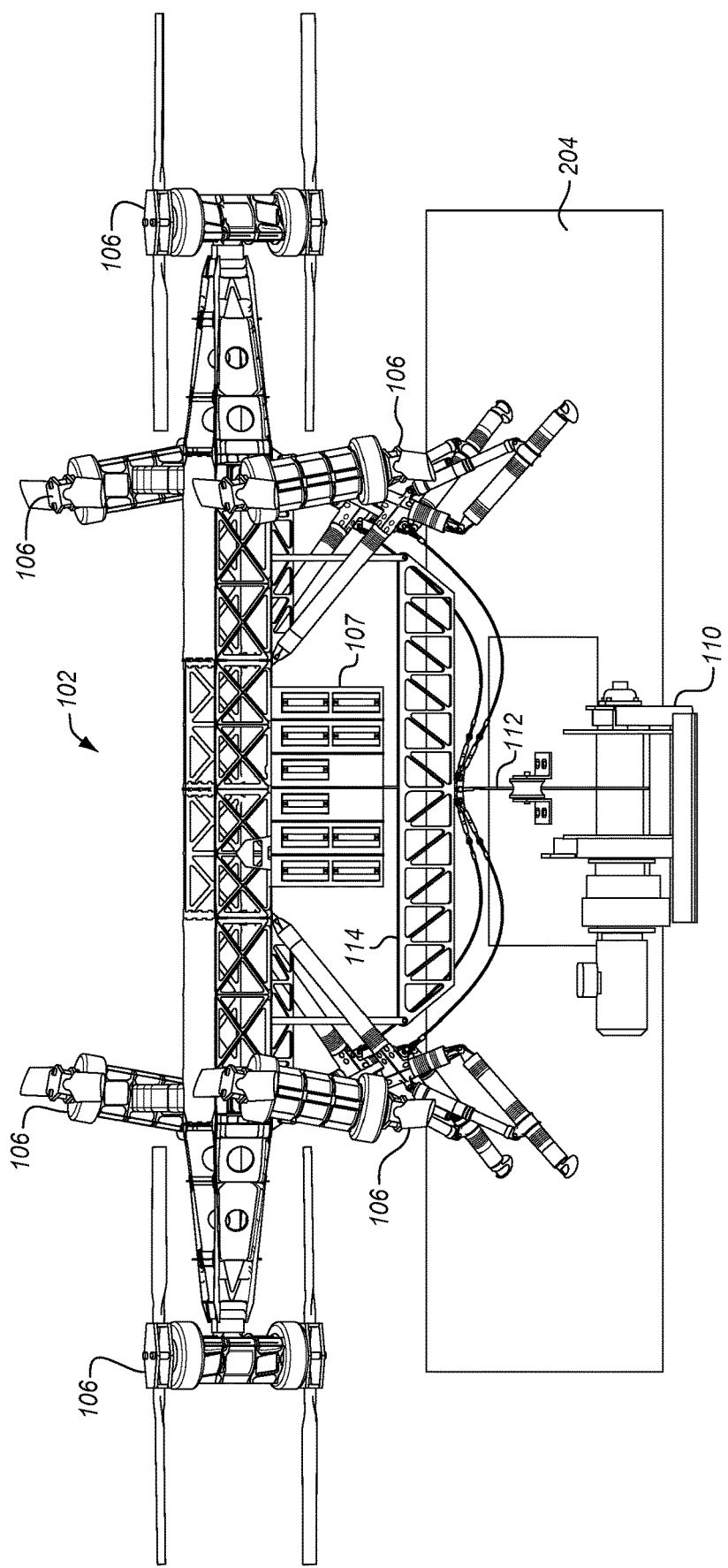
FIG. 6 is a side view of a UAV mounted on a mounting tree assembly in an illustrative embodiment.

A UAV 102 under test is pivotally coupled to a mounting tree assembly 114 (step 404). More particularly, vehicle connectors 124 on mounting tree assembly 114 are pivotally coupled to mounting locations 109 on UAV 102, such as with pins. FIG. 5 is a perspective view of UAV 102 mounted on mounting tree assembly 114 in an illustrative embodiment. FIG. 6 is a side view of UAV 102 mounted on mounting tree assembly 114 in an illustrative embodiment. FIGS. 5-6 show a more detailed version of UAV 102, which is provided for example. UAV 102 is a rotary-wing UAV in this example that is piloted remotely via a wireless remote control. The propulsors 106 of UAV 102 comprise dual-rotor electric motors in this embodiment. In FIG. 6, mounting tree assembly 114 is pivotally coupled to UAV 102 on opposing sides of battery box 107.

In FIG. 4, with UAV 102 mounted on mounting tree assembly 114, a test flight may begin. As thrust of propulsors 106 is increased to greater than the combined weight of UAV 102 and mounting tree assembly 114, winch 110 and cable 112 restrain UAV 102 to the ground. Controller 116 (see FIG. 1) may control winch 110 to reel out cable 112 allowing UAV 102 to ascend while maintaining tension on cable 112 (step 406). Controller 116 may adjust the resistance of winch 110 to control the ascent rate (step 412) of UAV 102. Thus, winch 110 is able to control the ascent without large shock loads and mechanical disturbance to the flight control system of UAV 102.

Figure 7:
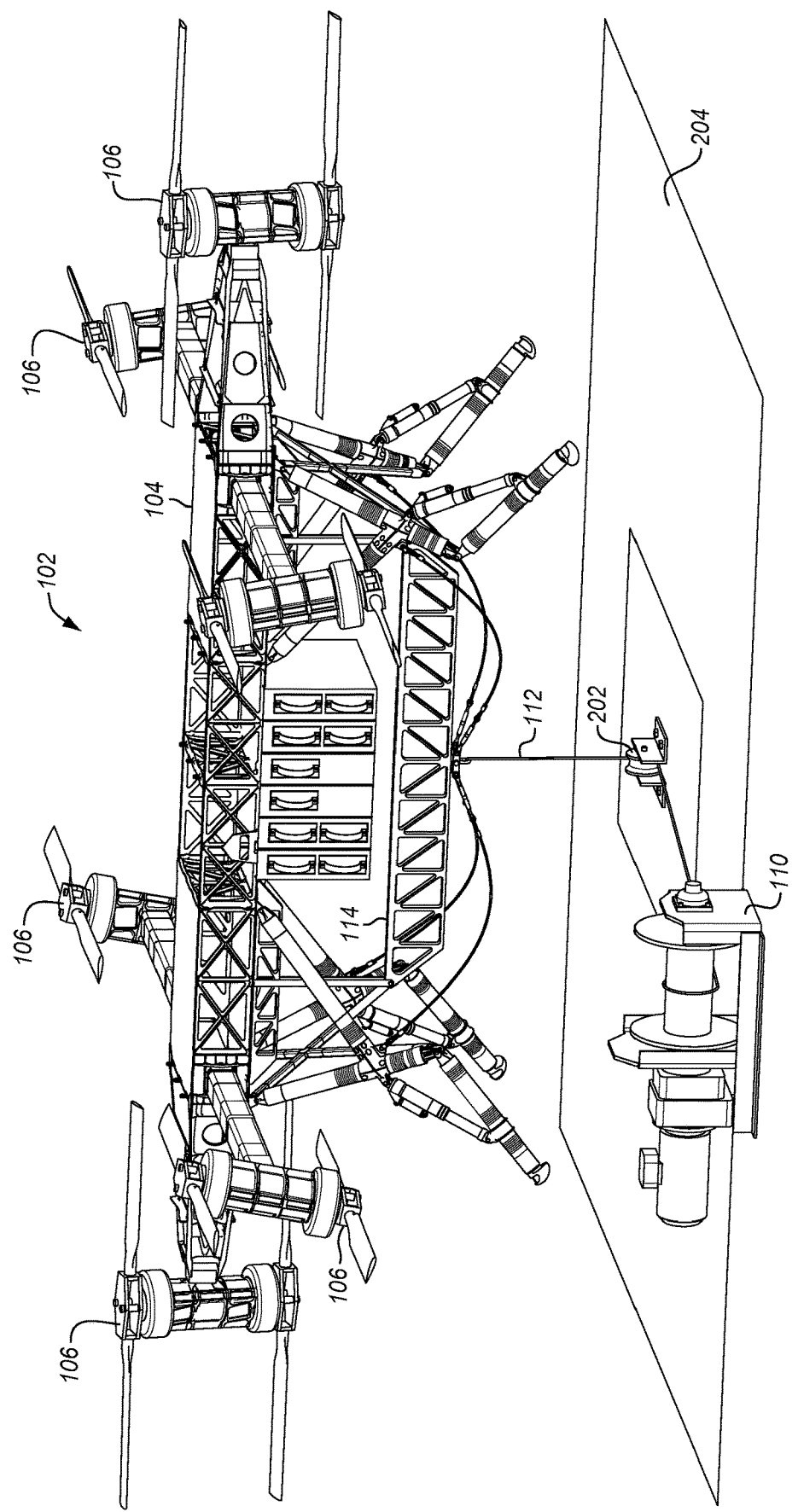
FIG. 7 is a perspective view of a UAV restrained by a winch in an illustrative embodiment.
Figure 8:
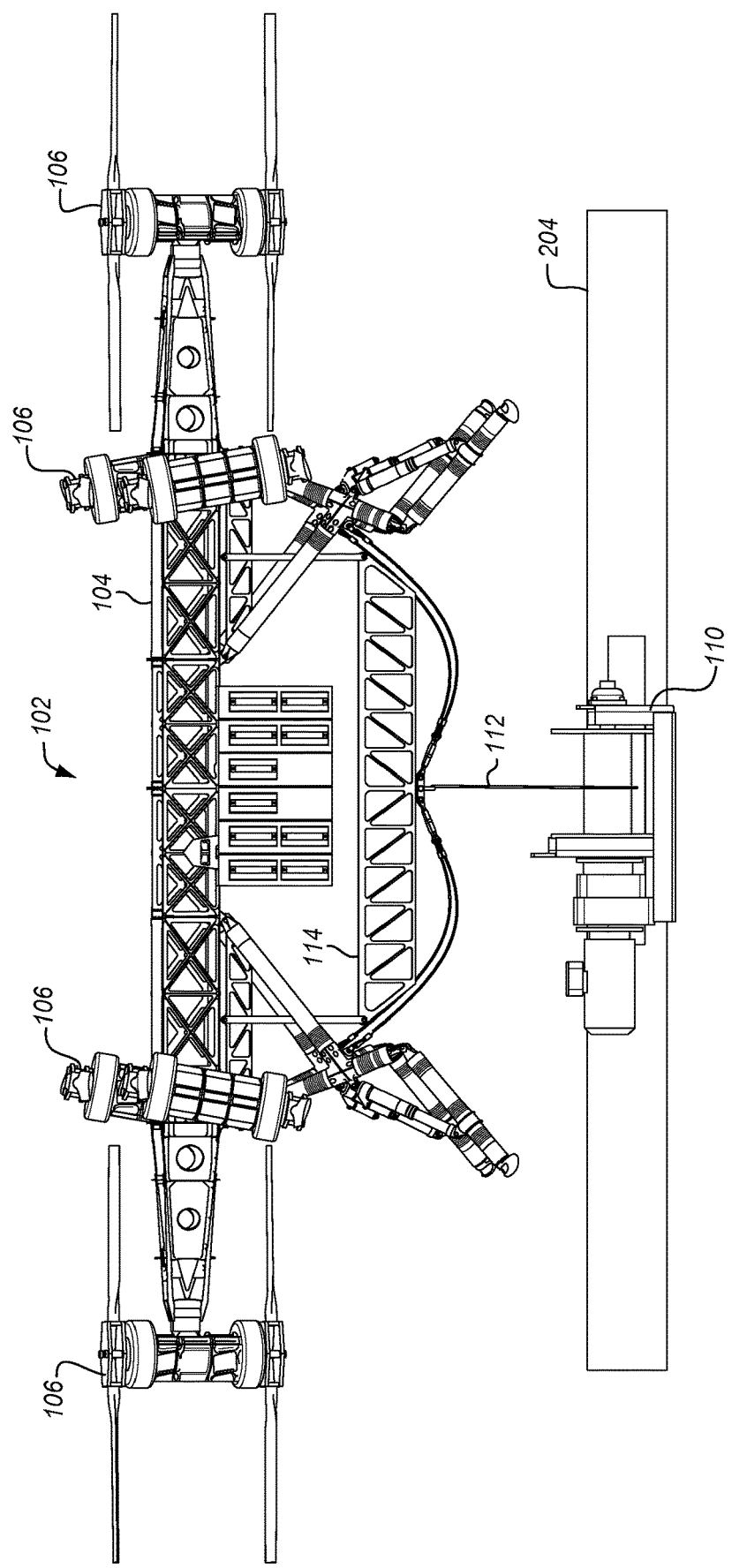
FIG. 8 is a side view of a UAV restrained by a winch in an illustrative embodiment.

When UAV 102 ascends to a desired maximum altitude, winch 110 restrains UAV 102 at a hover position (step 408). Winch 110 therefore stops reeling and holds UAV 102 at the hover position for the test. FIG. 7 is a perspective view of UAV 102 restrained by winch 110 in an illustrative embodiment. FIG. 8 is a side view of UAV 102 restrained by winch 110 in an illustrative embodiment. The altitude of UAV 102 is positively controlled as greater than hover power is used keeping positive tension on cable 112. While restrained, UAV 102 is able to pivot or rotate along multiple axes, and thus has five degrees of freedom due to the structure of mounting tree assembly 114 as described above. Thus, a test team may maneuver UAV 102 for the test, and evaluate its performance while restrained by winch 110. Winch 110 in combination with pulley 202 also provides position keeping in that UAV 102 is restrained generally above anchor point 206.

After or as part of the test, winch 110 may also control the descent of UAV 102 while maintaining tension on cable 112 (step 410). During descent, winch 110 reels in cable 112 so that cable 112 is taut. Winch 110 may overpower the propulsors 106 of UAV 102 to bring UAV 102 back to the ground (step 414) at a desired descent rate at any time without requiring the flight control system to reduce thrust. This may be used for an emergency recovery during the test.

Test system 100 and method 400 provide technical benefits in that UAV 102 is effectively restrained during hover flight for testing. Winch 110 controls the ascent and descent of UAV 102 by keeping tension on cable 112 to avoid large shock loads and mechanical disturbance to the flight control system of UAV 102. Also, if UAV 102 is non-responsive or other issues are encountered, winch 110 is able to overpower UAV 102 and bring it to the ground. The hover testing is therefore safe and more effective.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A test system for an Unmanned Aerial Vehicle (UAV), the test system comprising:
a winch having a cable; and
a mounting tree assembly configured to attach to the cable of the winch, and to attach to the UAV;
wherein the mounting tree assembly comprises:
a frame member pivotally coupled to the cable;
a first connecting arm having a first end pivotally coupled to the frame member;
a second connecting arm longitudinally spaced from the first connecting arm and having a first end pivotally coupled to the frame member; and
vehicle connectors at a second end of the first connecting arm and at a second end of the second connecting arm, wherein the vehicle connectors are configured to form a universal joint that allows the UAV to pivot about multiple axes in relation to a respective connecting arm;
wherein the winch is configured to restrain an altitude of the UAV at a hover position during a test flight of the UAV while the mounting tree assembly permits five degrees of freedom for the UAV.

2. The test system of claim 1 wherein:
the winch is configured to maintain tension on the cable to provide for a controlled ascent of the UAV to the hover position.

3. The test system of claim 2 further comprising:
a controller configured to adjust a resistance of the winch to control an ascent rate of the UAV.

4. The test system of claim 1 wherein:
the mounting tree assembly is configured to rotate about a vertical axis due to twisting of the cable;
the frame member is pivotally coupled to the cable to pivot about a first horizontal axis;
the first end of the first connecting arm is pivotally coupled to the frame member to pivot about a second horizontal axis that is parallel to the first horizontal axis;
the first end of the second connecting arm is pivotally coupled to the frame member to pivot about a third horizontal axis that is parallel to the first horizontal axis and the second horizontal axis;
the vehicle connectors at the second end of the first connecting arm and at the second end of the second connecting arm are configured to pivotally couple to the UAV to pivot about a fourth horizontal axis that is perpendicular to the first horizontal axis, the second horizontal axis, and the third horizontal axis; and
at least one of the vehicle connectors is configured to pivotally couple to the first connecting arm to pivot about a fifth horizontal axis that is parallel to the second horizontal axis, and at least one of the vehicle connectors is configured to pivotally couple to the second connecting arm to pivot about a sixth horizontal axis that is parallel to the third horizontal axis.

5. The test system of claim 4 wherein the first connecting arm is comprised of:
first vertical members and a first horizontal member that form a T-shape;
wherein one end of the first vertical members is pivotally coupled to the frame member to pivot about the second horizontal axis, and another end of the first vertical members are pivotally coupled to the first horizontal member so that the first horizontal member pivots about the fifth horizontal axis;
wherein a first pair of the vehicle connectors are spaced apart along a length of the first horizontal member.

6. The test system of claim 5 wherein the second connecting arm is comprised of:
second vertical members and a second horizontal member that form a T-shape;
wherein one end of the second vertical members is pivotally coupled to the frame member to pivot about the third horizontal axis, and another end of the second vertical members are pivotally coupled to the second horizontal member so that the second horizontal member pivots about the sixth horizontal axis;
wherein a second pair of the vehicle connectors are spaced apart along a length of the second horizontal member.

7. The test system of claim 4 wherein:
the cable pivotally couples with the frame member at a pivoting joint member that is disposed toward a longitudinal center of the frame member.

8. The test system of claim 1 further comprising:
a pulley disposed between the winch and the mounting tree assembly, and configured to change a direction of the cable from horizontal to vertical.

9. The test system of claim 1 further comprising:
a plurality of guide wires disposed between the mounting tree assembly and the UAV, and configured to restrict swinging of the mounting tree assembly in relation to the UAV.

10. A method of performing a restrained test flight of an Unmanned Aerial Vehicle (UAV), the method comprising:
pivotally coupling a mounting tree assembly to a cable of a winch;
pivotally coupling the UAV on the mounting tree assembly, wherein the mounting tree assembly comprises:
a frame member pivotally coupled to the cable;
a first connecting arm having a first end pivotally coupled to the frame member;
a second connecting arm longitudinally spaced from the first connecting arm and having a first end pivotally coupled to the frame member; and
vehicle connectors at a second end of the first connecting arm and at a second end of the second connecting arm, wherein the vehicle connectors are configured to form a universal joint that allows the UAV to pivot about multiple axes in relation to a respective connecting arm;
controlling the winch to reel out the cable allowing the UAV to ascend during the test flight while maintaining tension on the cable; and
restraining an altitude of the UAV at a hover position with the winch during the test flight, wherein the UAV has five degrees of freedom during the test flight.

11. The method of claim 10 further comprising:
stringing the cable through a pulley on a base surface to change a direction of the cable from horizontal to vertical.

12. The method of claim 10 wherein controlling the winch comprises:
adjusting a resistance of the winch to control an ascent rate of the UAV.

13. The method of claim 10 further comprising:
controlling a descent of the UAV while maintaining tension on the cable.

14. The method of claim 13 wherein controlling the descent of the UAV comprises:
  overpowering propulsors on the UAV to bring the UAV back to the ground.

15. A test system comprising:
  a winch having a cable; and
  a mounting tree assembly configured to attach to the cable of the winch, and to attach to an Unmanned Aerial Vehicle (UAV);
  the mounting tree assembly comprises:
    a frame member pivotally coupled to the cable to pivot about a first horizontal axis;
    a pair of connecting arms longitudinally spaced along the frame member;
    each of the connecting arms is a T-shaped member comprising:
      vertical members pivotally coupled to the frame member to pivot about a second horizontal axis that is parallel to the first horizontal axis; and
      a horizontal member pivotally coupled to the vertical members to pivot about a third horizontal axis that is parallel to the first horizontal axis and the second horizontal axis; and
      vehicle connectors configured to pivotally couple to the UAV to pivot about a fourth horizontal axis that is perpendicular to the first horizontal axis, the second horizontal axis, and the third horizontal axis.

16. The test system of claim 15 wherein:
  the mounting tree assembly is configured to rotate about a vertical axis due to twisting of the cable.

17. The test system of claim 16 wherein:
  the winch is configured to maintain tension on the cable to provide for a controlled ascent of the UAV to a hover position.

18. The test system of claim 17 further comprising:
  a controller configured to adjust a resistance of the winch to control an ascent rate of the UAV.

19. The test system of claim 15 further comprising:
  a pulley disposed between the winch and the mounting tree assembly, and configured to change a direction of the cable from horizontal to vertical.

20. The test system of claim 15 further comprising:
  a plurality of guide wires disposed between the mounting tree assembly and the UAV, and configured to restrict swinging of the mounting tree assembly in relation to the UAV.

* * * * *